July 1, 1958  D. E. LEE  2,841,161
HYDRAULIC SPEED-RESPONSIVE GOVERNORS
Filed June 21, 1955

Inventor
D. E. Lee
By Glascock Downing Seebolt
Attys.

United States Patent Office 2,841,161
Patented July 1, 1958

2,841,161

HYDRAULIC SPEED-RESPONSIVE GOVERNORS

Denis Ernest Lee, Acocks Green, Birmingham, England, assignor to Joseph Lucas (Industries) Limited, Birmingham, England Application June 21, 1955, Serial No. 517,026

Claims priority, application Great Britain June 28, 1954

1 Claim. (Cl. 137—58)

This invention relates to speed-responsive governors of the kind comprising a housing having a liquid inlet and outlet and a rotary hollow body contained in the housing, the said body being adapted to permit flow of liquid therethrough from the inlet to the outlet, and the rate of flow of liquid being determined by the pressure at which the liquid is admitted to the housing and the opposing action of a centrifugally operated valve contained in the rotary body. Such a governor may be use for controlling, for example, the rate of supply of liquid fuel to a prime mover, by utilizing the liquid pressure in the housing to control a fuel-regulating mechanism. Or it may be used for actuating a member the position of which is required to be varied in response to a change of speed of the mechanism which actuates the governor.

The object of the invention is to provide a governor of the kind above specified, in a form which minimizes hunting action of the valve.

The invention comprises a governor of the said kind having in combination with the rotary hollow body, a flexible diaphragm through which fluid pressure is transmitted to the valve actuating means, and a baffle adapted to minimize pressure pulsations in the liquid acting on the diaphragm.

Figure 1:
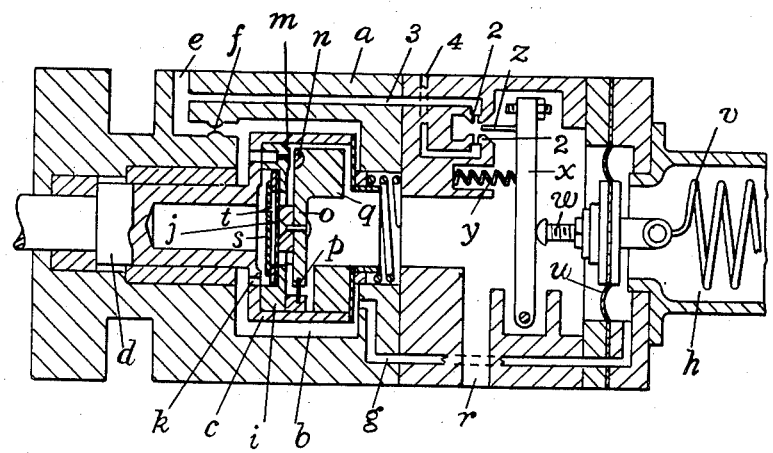
Figure 2:
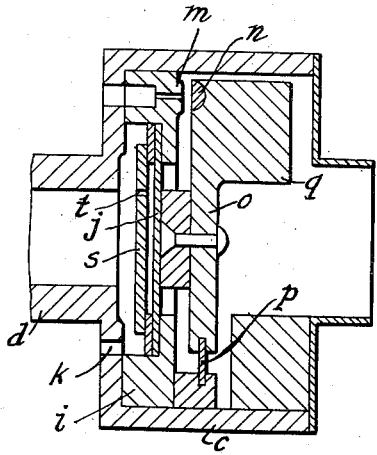

In the accompanying drawings, Figure 1 is a sectional side view of a governor embodying the invention for controlling the rate of supply of liquid fuel to a jet-propelled engine, gas turbine, or other engine in response to variations of speed, and Figure 2 is a similar view illustrating to a larger scale than Figure 1 the rotary hollow body of the governor and the parts contained therein.

Referring to the drawings, there is provided a housing $a$ having therein a chamber $b$ which contains a hollow rotary body $c$ to be driven by the engine through a spindle $d$. Motive liquid is admitted to the said chamber at $e$ from a pump (which may be the fuel pump) driven by the engine, through a restricted orifice $f$, and liquid is taken from this chamber by way of a passage $g$ to a chamber $h$ and is there utilized as hereinafter described for controlling the action of a liquid-operated servo mechanism which controls the rate of fuel supply to the engine.

Within the rotary body $c$ is secured an annular member $i$ on which is secured a flexible diaphragm $j$ which divides the interior of the said body into two compartments, and liquid is admitted to one of the compartments from the said chamber through an aperture $k$ in the side of the said body. Liquid is also admitted from the said chamber to the other compartment of the rotary body through a valve. The valve comprises a seating $m$ on the said annular member and a closure member $n$ carried by a lever $o$ contained in the said other compartment. At the end remote from the closure member the lever is pivotally attached to the rotary body by any convenient hinge, such as a short flexible metal blade $p$, and the end of the lever adjacent to the closure member is shaped to serve as a centrifugal mass $q$ by the action of which the closure member can be moved towards the seating for restricting the rate of flow through the rotary body and thence through an outlet $r$ to a sump or the inlet side of the pump which provides the motive liquid.

The lever $o$ is also attached to the diaphragm $j$, and at the side of the diaphragm remote from the said lever is arranged a baffle $s$ having therein a restricted orifice $t$ through which liquid can pass to a relatively narrow space between the baffle and the diaphragm. The baffle may be an integral part of the rotary body, or it may consist (as shown) of a rigid disc attached to one side of the annular member $i$.

In the particular example illustrated by the drawings, the chamber $h$ is flanked at one end by a flexible diaphragm $u$ which is loaded by an adjustable tension spring $v$, and from one side of the diaphragm extends an abutment $w$ which can act on a lever $x$, which is loaded by a compression spring $y$ and which carries a shutter $z$. The shutter serves to intercept a jet of liquid flowing across a gap between a pair of nozzles 2. One of the nozzles receives liquid from the inlet $e$ through a passage 3, and the other conveys liquid through a passage 4 to a servo-mechanism (not shown).

The arrangement is such that with low rotation speeds of the governor the valve actuated by the lever $o$ is open, and is held open by the pressure of the liquid acting on the left hand side of the diaphragm $j$. In this condition, liquid can flow freely from the inlet $e$ to the outlet $r$ at a rate determined by the restricted orifice $f$ and the size of the aperture in the valve seating. Also in this condition the liquid pressure in the chamber $b$ is substantially lower than that at the inlet $e$ and is insufficient to have any effect on the diaphragm $u$. Meanwhile liquid at the inlet pressure is conveyed by the passages 3 and 4 to the servo-mechanism where it causes the latter to move to the position at which fuel is supplied to the engine at maximum rate. But with increasing speed the centrifugal force acting on the lever $o$ causes the latter to move in the direction for restricting the flow through the valve and eventually arresting this flow. As a consequence the pressure of the liquid in the chamber $b$ rises, and becomes sufficient to move the diaphragm $u$, which movement advances the shutter $z$ into the stream flowing between the nozzles 2, thereby restricting or interrupting the flow to the servo-mechanism, whereupon the latter moves in the direction for reducing the fuel supply to the engine.

The effect of the baffle $s$ above mentioned is to damp down liquid pressure fluctuations acting on the diaphragm $j$, and so minimize any inherent tendency to hunting of the governor.

Whilst governors in accordance with the invention are particularly required for controlling the rate of supply of liquid fuel to engines, they may be applied also to other analogous uses, such as that of varying the adjustment of the guide vanes of a turbo-compressor in response to variation of speed of an associated prime mover. Further, the invention is not restricted to the particular means above described for controlling the action of a servo-mechanism, as instead of a shutter between a pair of nozzles, a valve operated by the lever $x$ may be employed.

Having thus described my invention what I claim as new and desire to secure by Letters Patent is:

A hydraulic speed-responsive governor comprising in combination a housing having an inlet and an outlet for liquid under pressure, a rotary hollow body contained in the housing, a flexible diaphragm dividing the interior of the hollow body into first and second compartments the first of which communicates with the interior of the housing through an opening in the hollow body, and the second of which communicates with a region of low pressure leading to the housing outlet, a valve arranged to establish communication between the two compartments and provided with centrifugally operable actuating means within the hollow body so that the actuating means tends to close the valve in response to centrifugal force derived from rotary motion of the hollow body, and a baffle provided with a restricted orifice and arranged within the first compartment to provide between the baffle and diaphragm a narrow space to which liquid under pressure admitted to the first compartment has access through the restricted orifice so that the effect of the baffle is to damp down pressure fluctuations in the liquid acting on the diaphragm, and so minimize any inherent tendency to hunting of the governor.

References Cited in the file of this patent

UNITED STATES PATENTS

| | | |
|---|---|---|
| 2,646,813 | Mueller | July 28, 1953 |
| 2,650,455 | Jacobsson et al. | Sept. 1, 1953 |